April 10, 1962  C. H. BORNEMAN  3,028,773
DRILL
Filed July 30, 1959
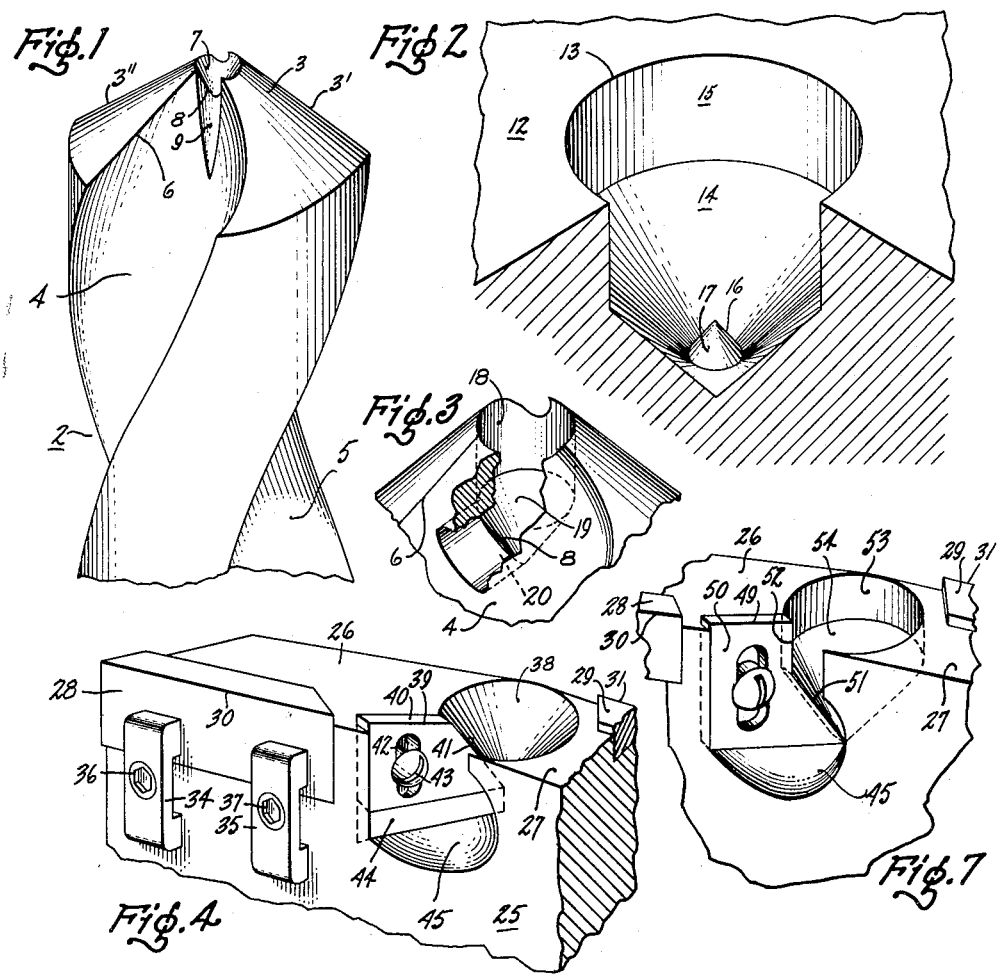
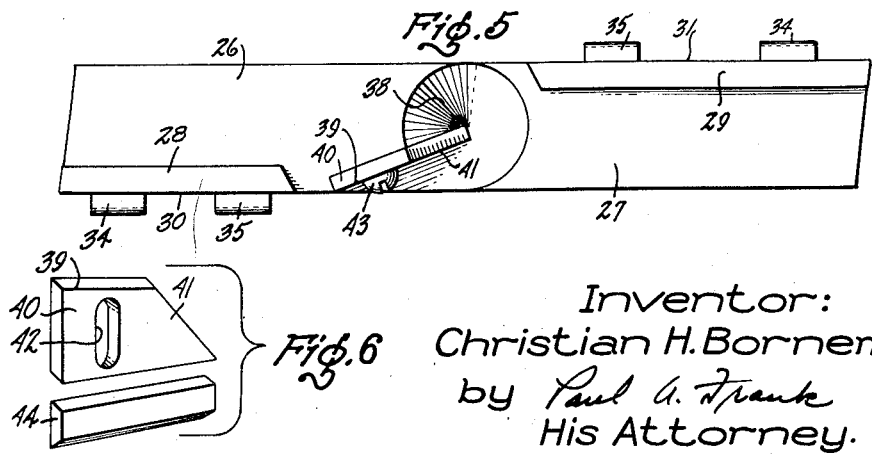
Inventor:
Christian H. Borneman,
by Paul A. Frank
His Attorney.

United States Patent Office 3,028,773
Patented Apr. 10, 1962

3,028,773
DRILL
Christian Henry Borneman, Schenectady, N.Y., assignor to General Electric Company, a corporation of New York
Filed July 30, 1959, Ser. No. 830,550
12 Claims. (Cl. 77—70)

This invention relates to cutting drills, and more particularly, to cutting drills having aligning means.

In drilling tools for cutting circular openings in work pieces, there is a tendency for the cutting drill to "walk." By "walking" is meant that the axis of the tool wanders with respect to the axis of the hole being drilled. This causes the shape of the hole to be either out of round, or to be of a size larger than desired, or both. This condition is most severe when the hole to be formed is initially started and continues during the remainder of the cutting operation.

Walking by the tool is normally caused by one cutting edge of the tool moving more slowly than the other. Such irregular movement of the cutting edges is caused either by unbalance in the tool itself or by unequal restraint on the cutting edges during a cutting operation. Various attempts have been made to adequately support drills to maintain the axis of the hole and tool concentric. The sides of the hole produced by the drill often are utilized as a guide. In some instances a bushing may be used to guide the drill. It has also been suggested that a projection be formed around the axis of the drill in the hole being formed by placing a groove across the point of the drill and substantially at right angles to the cutting lips of the drill. These methods of guiding the drill have met with limited success.

The present invention envisions forming a projection in the hole being drilled which will act as a journal for the drill as it passes through the work piece. This journal and bearing arrangement support the drill at a point adjacent the cutting surfaces of the drill thereby assuring that the hole and drill are concentric.

The chief object of the present invention is to provide an improved drill having means for journalling the drill at a point adjacent the cutting edges of said drill.

Another object of the invention is to provide an improved drill which forms a protuberance in the hole cut in the work piece having an annular surface concentric with the hole upon which the drill is journalled as it passes through the work piece.

These and other objects of the invention will become more apparent from the following description.

In accordance with my invention a tool, adapted to form a circular opening in a work piece, has its end portion provided with a cutting edge to form a protuberance in the material being worked. The protuberance so formed has a substantially annular surface with which the tool is in bearing engagement to maintain the tool concentric with the axis of the hole being formed. A cutting edge is provided to continually maintain the size of this protuberance constant.

The invention will be more clearly understood from the detailed description of preferred embodiments described in the accompanying drawings in which:

FIGURE 1 is a perspective view of a twist drill embodying the present invention;

FIGURE 2 is a perspective view, partially in section of a hole, formed by the twist drill in FIGURE 1;

FIGURE 3 is a sectional view of the tip of a twist drill of another embodiment of the invention shown in FIGURE 1;

FIGURE 4 is a fragmentary perspective view of a spade drill embodying the present invention;

FIGURE 5 is a view in plan of the spade drill shown in FIGURE 4;

FIGURE 6 is a perspective view of the cutting tool and spacer utilized in the spade drill shown in FIGURES 4 and 5; and FIGURE 7 is a fragmentary perspective view of another embodiment of the spade drill shown in FIGURE 4.

Referring to FIGURE 1, there is shown a twist drill 2 having a general cylindrical shape with a tip portion 3. This tip portion 3 may be of a general conical shape. It is common practice to make each surface 3' and 3" a sector of a cone, the axis of each cone not necessarily being coaxial.

The twist drill 2 includes means defining flutes 4 and 5. These flutes extend helically along the cylindrical surface of the drill 2. At the intersection of the flutes with the surface of the tip portion 3 suitable cutting edges are formed. In FIGURE 1 the flute 4 is shown intersecting the surface of the tip portion 3 to form the cutting edge 6.

This portion of the twist drill is typical of most conventional drills. In operation, rotation of the twist drill in a clockwise direction will cause the cutting edge 6 to engage the work piece and remove material therefrom in the form of chips. These chips are directed away from the cutting edge by being urged through the flutes associated with the cutting edge and away from the work piece.

As previously mentioned, there is a tendency for the twist drill to "walk." To some extent the cylindrical side walls of the twist drill form guide walls for the drill. This form of guide is inadequate in many instances, and especially, during the starting operation there is no surface with which the side walls of the drill can be guided.

In order to provide guide means located substantially adjacent the cutting area of the tool, a substantially conical opening is formed in the center of the tool concentric with the axis of the tool. This substantially conical surface 7 performs a bearing function against a protuberance formed upon initial entry of the drill into the work piece. The protuberance achieves a maximum height and depending on its shape it is necessary to cut away a portion of the complementary bearing surface of the protuberance so that the tool may advance.

To perform this function the cutting edge 8 is provided with a suitable secondary flute 9. It can be seen in the embodiment of FIGURE 1 that as the tool advances the protuberance in the work piece has its profile shaved by the cutting edge 8. The material cut from the protuberance is discharged into the secondary flute 9 which passes the material into the flute 4 which is associated with the cutting edge 6.

Referring to FIGURE 2 there is shown, in section, a hole in a work piece 12 drilled by the twist drill 2 shown in FIGURE 1. The hole 13 in the work piece 12 has a cylindrical portion 15 and below the cylindrical portion there is a substantially conical portion 14. It will be appreciated that as the tool advances the cutting edge 6 engages and cuts into the conical portion 14.

As previously mentioned, in a conventional tool it is very common for the axis of the tool 2 to move eccentrically of the axis of the opening 13. This is caused by the irregular movement of the cutting edges of the drill. With the present invention a bearing surface is formed to support the tool and this bearing surface is located adjacent the cutting edges of the tool. In the embodiment of FIGURE 1 this bearing surface is substantially conical in shape and in FIGURE 2 there is shown a protuberance formed by the tool in FIGURE 1. This protuberance 16 has a substantially conical surface 17 which, in effect, is a substantially annular surface extending concentrically about the axis of the hole 13.

The surface 7 is not completely conical. Because of the need for a cutting edge 8 and a flute 9 through which material cut from the protuberance can be removed, the surface 7 has an open portion. The surface 7 engages substantially a major portion of the bearing surface 17 of the protuberance 16, preferably greater than an angle of 270°. The size of the discontinuity in the surface 7 is made sufficiently small so that the twist drill is supported by the protuberance 16 substantially about the entire 360° of its annular surface.

In FIGURE 3 there is shown a tip portion of another embodiment of the twist drill shown in FIGURE 1. In this particular embodiment, the opening, concentric with the axis of the twist drill, comprises a cylindrical portion 18 and a conical portion 19. The major portion of the bearing load is sustained by the surface 18. The cutting edge 8 which maintains the maximum length of the protuberance acts along the conical surface 19 of the tool. In this embodiment the surface 18 extends the entire 360° of the protuberance and the cutting edge 8 associated with the conical surface 19 may have associated therewith a suitable hole 20 placing the conical surface 19 in communication with the flute 4 for the purpose of removing metal chips formed adjacent the substantially conical surface 19.

FIGURE 4 is directed to another embodiment of the invention wherein the guide means are employed on a spade drill. The end portion 25 of the spade drill is shown having two angular surfaces 26 and 27 at the tip thereof. In one indented portion of the spade drill adjacent the surface 26 is mounted a tool 28 having a cutting edge 30. Adjacent the surface 27 is mounted a cutting tool 29 having a cutting edge 31. These tools may be held in position on the spade drill body by means of suitable clamps 34 and 35. In the embodiment in FIGURE 4, these clamps are held against the cutting tool 28 and the end portion of the spade drill by means of Allen head screws 36 and 37. A plan view of the tool shown in FIGURE 4 appears in FIGURE 5. In the center portion of the tool there is shown a substantially conical bearing surface 38 with a suitable cutting member 40 associated therewith. The cutting member 40 has a cutting edge 39, an angular cutting edge 41 and a longitudinal slot 42. By means of a suitable bolt 43 passed through the slot 42, the cutting member 40 is attached to the end portion 25 of the spade drill. A suitable spacer 44 is provided for the purpose of positioning the tool in a proper relationship with respect to the bearing surface 38. An exploded view of the cutting member 40 and the spacer 44 is shown in FIGURE 6.

During a cutting operation with the spade drill shown in FIGURE 4, the cutting edges 30 and 31 of the cutting members 28 and 29 engage the work piece cutting an annlar groove therein. Either because of the orientation of these cutting members or because of the cutting edge 39, a protuberance is formed in the work piece of a diameter approximately the size of the widest portion of the conical surface 38. In order that the conical surface 38 may bear against the protuberance in the work piece, the cutting edge 41 of the cutting member 40 shaves the protuberance so that a substantial portion of its outer annular surface is substantially co-incident with the bearing surface 38.

In order that material may be removed from the edge 51 a flute 45 must be formed in the end 25 of the spade drill. It is highly desirable that the bearing surface 38 approach a full cone. However, an interruption in the surface necessary for the previously described functions of cutting and chip removal. It will be noted that the bearing surface 38 extends an angle exceeding 270° so that substantial support to the spade drill is given for almost a full 360°. Since the bearing surface is in close proximity to the cutting edges 30 and 31, the spade drill will form a hole wherein the axis of the tool and the axis of the hole in the work piece are substantially concentric.

Another embodiment of the spade drill shown in FIGURE 4 is disclosed in FIGURE 7. In this embodiment, the spade drill body has a substantially cylindrical bearing surface 53 below which there may be a conical surface 54. It has been found that a cylindrical surface provides better support than a conical surface against lateral motion. With such a construction the protuberance in a work piece will have an annular cylindrical portion and at its extremity the protuberance will have a general conical shape.

The cutting tool, therefore, will be of a different character than that disclosed in FIGURES 4, 5, and 6. The cutting member 50 has a cutting edge 49, an angular cutting edge 51 and a straight edge 52 which extends in a direction substantially parallel to the annular bearing surface 53 between the edges 49 and 51. In the embodiment of FIGURE 7 the bearing surface 53 is not completely annular since an interruption is required for the tool 50.

In operation, the protuberance in the work piece is formed by the cutting edges 30 and 31. As the protuberance is formed it is engaged by the surface 53 which substantially restrains the tool from movement in a lateral direction. After the protuberance has reached a predetermined length it is engaged by the cutting edge 51 which forms a conical tip on the protuberance. When the protuberance achieves a maximum length, its length is maintained by the cutting edge 51. The material that is shaved from the protuberance is removed through the flute 45.

In some instances a spade drill employing the present invention may be provided with a full annular bearing surface in a manner as taught by FIGURE 3. The flute 45 may be a passage which will place the opening formed by the bearing surface in communication with the external portion of the tool. A fully annular bearing surface is an optimum form of the present invention since the tool receives with such a construction, full support about 360°.

While there have been described preferred embodiments of the present invention it will be appreciated that the invention is not limited thereto but that various modifications may be made without departing from the scope of the appended claims.

What I claim as new and desire to secure by Letters Patent of United States is:

1. In a tool adapted to form a circular opening on a work piece the combination of an end portion, cutting means associated with the end portion, means to form a protuberance in the work piece having a substantially annular surface concentric with the circular opening in the work piece, means for maintaining the length of the protuberance constant as the tool advances and means for engaging simultaneously a major portion of the substantially annular surface of the protuberance to support the tool concentric with the axis of the opening as the tool advances.

2. A tool according to claim 1 in which the means for maintaining the length of the protuberance comprises a cutting portion angularly disposed to the axis of the cutting tool.

3. A tool according to claim 2 in which the means for engaging the annular surface of the protuberance is at least a sector of a cylinder.

4. A twist drill for forming a circular hole in a work piece comprising a conical tip portion, a plurality of cutting portions associated with said tip portion, means defining a helical flute associated with each cutting portion, each helical flute extending away from the tip portion, means associated with said tip portion for forming in the work piece as the tool advances a protuberance having a substantially annular surface concentric with the axis of the circular opening, means for contacting simultaneously in bearing engagement a major portion of the annular surface of the protuberance to maintain the drill concentric with the axis of the opening and means for maintaining the length of the protuberance substantially constant as it passes into the work piece.

5. A twist drill according to claim 4 in which the means for contacting the protuberance comprises a surface having substantially the shape of a sector of a cylinder extending an angle greater than 270°.

6. A twist drill according to claim 4 in which the means for maintaining the length of the protuberance constant is a cutting edge angularly disposed to the axis of the drill.

7. A spade drill for forming a circular opening in a work piece comprising a body member, at least one tool having a longitudinal edge, means for clamping the tool to the body member, means for forming a protuberance extending into the opening formed by the longitudinal edge, the protuberance having a substantially annular surface concentric with the axis of the circular opening, bearing means associated with said body member for engaging simultaneously a major portion of the annular surface of the protuberance to maintain the spade drill concentric with the axis of the circular opening in the work piece, means for maintaining the length of the protuberance substantially constant as the spade drill passes into the work piece.

8. The spade drill according to claim 7 in which the bearing means comprises at least a sector of a cylinder extending an angle greater than 270°.

9. A spade drill according to claim 7 in which the means for maintaining the length of the protuberance constant comprises a cutting member, means for affixing the cutting member to the body member, said body member having means for moving chips away from the last mentioned cutting member.

10. In a tool adapted to form a circular opening in a work piece the combination of an end portion, cutting means associated with the end portion, means to form a protuberance in the work piece having a substantially annular surface concentric with the circular opening in the work piece, means including a cutting portion angularly disposed to the axis of the cutting tool for maintaining the length of the protuberance constant as the tool advances and means including at least a surface having the shape of at least a sector of a cone for engaging a major portion of the substantially annular surface of the protuberance to support the tool concentric with the axis of the opening as the tool advances.

11. A twist drill for forming a circular hole in a work piece comprising a conical tip portion, a plurality of cutting portions associated with said tip portion, means defining a helical flute associated with each cutting portion, each helical flute extending away from the tip portion, means associated with said tip portion for forming in the work piece as the tool advances a protuberance having a substantially annular surface concentric with the axis of the circular opening, means including a surface having substantially the shape of a sector of a cone extending an angle greater than 270° for contacting in bearing engagement a major portion of the annular surface of the protuberance to maintain the drill concentric with the axis of the opening and means for maintaining the length of the protuberance substantially constant as it passes into the work piece.

12. A spade drill for forming a circular opening in a work piece comprising a body member, at least one tool having a longitudinal edge, means for clamping the tool to the body member, means for forming a protuberance extending into the opening formed by the longitudinal edge, the protuberance having a substantially annular surface concentric with the axis of the circular opening, bearing means including a surface having the shape of at least a sector of a cone extending an angle greater than 270° associated with said body member for engaging a major portion of the annular surface of the protuberance to maintain the spade drill concentric with the axis of the circular opening in the work piece, means for maintaining the length of the protuberance substantially constant as the spade drill passes into the work piece.

References Cited in the file of this patent
UNITED STATES PATENTS

| | | |
|---|---|---|
| 10,744 | Pease | Apr. 4, 1854 |
| 516,277 | Parks | Mar. 13, 1894 |

FOREIGN PATENTS

| | | |
|---|---|---|
| 158,036 | Australia | Aug. 3, 1954 |
| 873,752 | France | July 20, 1942 |